Figure 1:
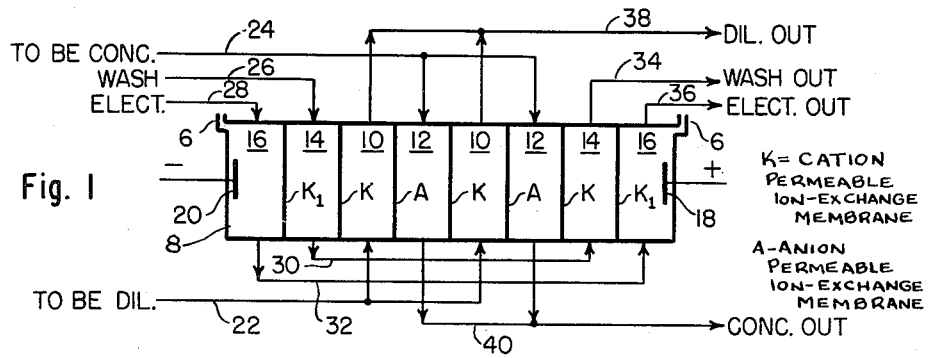

Nov. 16, 1954     W. E. KATZ ET AL     2,694,680

TRANSFER OF ELECTROLYTES IN SOLUTION

Filed Aug. 30, 1952

INVENTORS
WILLIAM E. KATZ
NORMAN W. ROSENBERG
BY
Kenway, Jenney, Witter & Hildreth
ATTORNEYS United States Patent Office 2,694,680 Patented Nov. 16, 1954

2,694,680

TRANSFER OF ELECTROLYTES IN SOLUTION

William E. Katz, Cambridge, and Norman W. Rosenberg, Newton, Mass., assignors to Ionics, Incorporated, Cambridge, Mass., a corporation of Massachusetts Application August 30, 1952, Serial No. 307,302

12 Claims. (Cl. 204—180)

The present invention relates to processes employing electrical energy to effect the migration of ions from one solution to another across ion permeable barriers separating the solutions, and consists in apparatus and methods for transferring dissolved electrolyte from one solution to another.

The invention utilizes a plurality of concentrating and diluting cells, each having a set of diluting chambers (for one solution) alternately disposed between a set of concentrating chambers (for the other solution) and separated therefrom by membranes through which anions and cations of dissolved electrolyte are transferred from diluting chambers to concentrating chambers, by the passage of a direct electric current in series across the membranes and the chambers defined between them. Such cells, particularly adapted for use in this invention and preferred methods of constructing them, are fully described in our copending application, Ser. No. 300,302, filed July 22, 1952.

A single concentrating and diluting cell containing a plurality of concentrating and diluting chambers has been found to have only limited utility for transferring electrolyte from one solution to another. The rate at which electrolyte may be removed from any diluting chamber is limited by the current flowing through the chamber and by the rate at which the ions of the electrolyte can migrate by diffusion to and through the bordering membranes, the migration rate being among other things a function of the electrolyte concentration in the diluting chamber. The concentration, therefore, limits the effective current that can be passed through a diluting chamber and attempts to flow larger currents cause polarization at the memberane surface and also frequently electrolytic decomposition of the water of aqueous solutions into hydroxyl and hydrogen ions. This interdependence of maximum current and concentration limits the usefulness of a single concentrating and diluting cell, for the current necessary to remove any given fraction of the dissolved electrolyte from the solution in the diluting chambers must be proportional to the rate of flow, but must not exceed the limit imposed by the rate of ion migration established by the concentration. With the current thus limited by the concentration of the solution, the amount by which the electrolyte concentration of that solution is to be reduced imposes a limit on the rate at which it can be flowed through the diluting chambers of the cell. Moreover, since the several chambers of the cell are in electrical series, and since it is impossible to construct a cell in which every chamber is fed with identical solutions at identical flow rates, that chamber having the lowest electrolyte concentration limits the current that can be passed through the entire cell. Where substantially complete removal of electrolyte from the solution to be diluted is desired, a minor deviation in the concentration of solution in any diluting chamber below the average concentration, will greatly reduce the current that can be passed through the entire cell, or will result in polarization and water dissociation if the maximum current for the remaining chambers is flowed.

The present invention provides systems employing concentrating and diluting cells in the form of stages which avoid the limitations inherent in a single concentrating and diluting cell and in which the economical and efficient transfer of electrolyte from one solution to another may be carried out to any desired degree. The systems of this invention are particularly useful for the removal of electrolytic impurities from solutions of non-electrolytes, e. g. the removal of salt from glycerine by-products of soap manufacture, or the removal of ash from sugar solutions; or for the recovery of electrolytic values from waste streams, e. g. the recovery of organic salts from fermentation baths; or for the demineralization of sea water or other supplies of water of undesirably high dissolved salt content.

In general the systems of this invention comprise a plurality of concentrating and diluting cells in stages, each having its diluting chambers connected for parallel flow, with the sets of diluting chambers of the several cells (and if desired also the sets of concentrating chambers) connected in stage-to-stage series. In preferred embodiments the concentrating chambers of the cells in each stage are also connected for parallel flow and the adjacent concentrating and diluting solutions of each adjacent stage are flowed in generally countercurrent directions; that is to say, fractions of diluting solution of like composition are flowed from a common manifold into each diluting chamber and fractions of concentrating solution of like composition are similarly flowed into each concentrating chamber of each stage, preferably in generally mutually countercurrent directions. Such systems, accordingly, provide the advantages outlined above by effecting the desired transfer of electrolyte incrementally with each stage operated under conditions that are optimum for the increment of the process carried out in it. Parallel feed to the diluting chambers of each cell of each stage provides solutions of nearly equal concentration to each diluting chamber, and by carrying out only an increment of the total demineralization of the diluting solution in any single stage, the effects resulting from deviations in the flow rates among the several diluting chambers, causing unequal concentrations in the diluting chambers, are minimized, since no attempt is made to remove all the electrolyte from the influent diluting solution in any stage. Rather by successively removing a limited fraction of electrolyte present in the influent diluting solutions in each stage, the final concentration of the diluting solution is eventually reduced to any desired value. The degree of concentration change attainable in any stage depends in part on the concentration and nature of the solution treated and also on an economic balance between the savings of lower power consumption and the expense of additional or larger stages. Generally, however, the removal of upwards of 30%, and frequently as much as 90% of the electrolyte from the diluting stream in each stage may readily be accomplished. Thus, five stages can generally be utilized to reduce the concentration of the solution to be diluted by a factor of between about 10 and about 100,000.

In the operation of systems of this invention, the hydraulic flow rates and electric current supplied to each stage are preferably adjusted so that in each stage the fraction of electrolyte removed from the donor (diluting) solution influent to that stage is approximately the same, preferably between 30% and 90%. A demineralization ratio, D, for each cell may be defined as (I)

$$D=\frac{N_e}{N_i}$$

where $N_i$ is the concentration of the influent donor solution and $N_e$ is the concentration of the effluent donor solution. Under these preferred operating conditions, the number of stages required to change the concentration of a diluting stream from the initial concentration of $N_0$ to a final concentration of $N_f$ is given by the formula (II) $$N_f=N_0D^M$$

where M is the number of stages.

Where the electrolyte concentration of the donor solution is less than about 0.1 M and it is desired to operate each of several similarly constructed cells at the same applied voltage, while maintaining optimum operating conditions, including approximately equal demineralization ratios, each cell should have a number of diluting chambers equal approximately to $D^{+0.5}$ times the number of diluting chambers of the preceding cell (preceding referring to the order of flow of the diluting solution).

Figure 2:
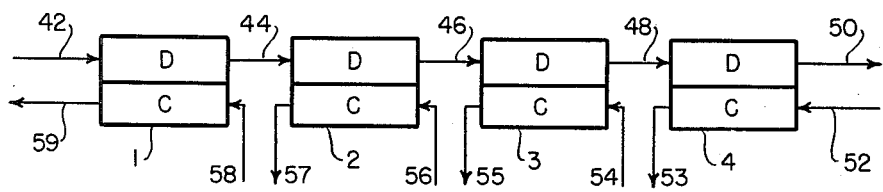
Figure 3:
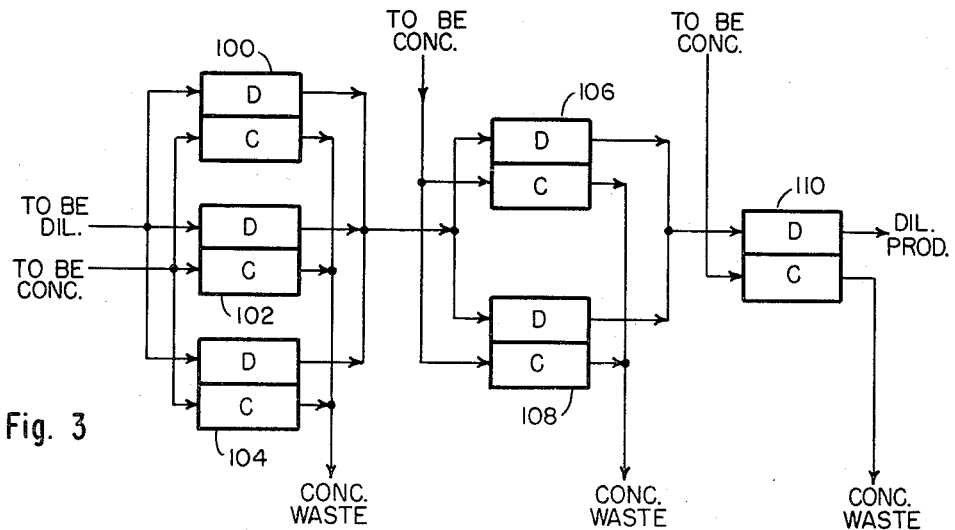

This invention will be more fully understood from the following detailed description of representative embodiments thereof selected for purposes of illustration wherein reference is made to the drawings in which:

Fig. 1 shows schematically a simple concentrating and diluting cell in elevational cross section, Fig. 2 shows schematically a plurality of concentrating and diluting cells comprising the stages embodied in one system of this invention, and Fig. 3 shows schematically a plurality of concentrating and diluting cells comprising the stages embodied in another system of this invention.

A concentrating and diluting cell unit shown schematically in Fig. 1 consists in general of a container 8 divided into parallel alternating diluting chambers 10 and concentrating chambers 12 by alternating membranes K selectively permeable to cations and membranes A selectively permeable to anions. Electrodes 18 and 20 are provided at the ends of the container 8, and between each electrode and the ends of the battery of diluting and concentrating chambers 10 and 12 is situated an additional membrane $K_1$ (preferably cation permeable) defining electrode chambers 16 and washing chambers 14. A vent 6 in each electrode chamber 16 allows gases generated by electrolysis to escape from the cell. The washing chambers 14 and electrode chambers 16 do not function directly in the concentrating and diluting process, but are provided to minimize contamination of the solutions in the concentrating and diluting chambers by the products of electrolysis.

The diluting chambers 10 and concentrating chambers 12 are separately fed in parallel for mutually countercurrent flow through conduits 22 and 24 respectively, and the solutions are removed through conduits 38 and 40 respectively. The washing chambers 14 and electrode chambers 16 are each separately connected in series by influent conduits 26 and 28 respectively, connecting conduits 30 and 32 respectively, and effluent conduits 34 and 36 respectively.

In operation, separate streams of a salt solution to be diluted and concentrated are passed through the diluting chambers 10 through conduits 22 and 38 and through concentrating chambers 12, through conduits 24 and 40 respectively. A washing stream of the same solution is passed through the washing chambers 14, through conduits 26, 30 and 34, and an electrolytically conductive solution is passed through the electrode chambers 16 through conduits 28, 32 and 36. An electric current is then passed through the cell so that the electrode 18 on the anion permeable membrane side of the diluting chambers 10 is the anode, thus to cause cations to cross the cation permeable barriers K in migration toward the cathode, and anions to cross the anion permeable membranes A in migraiton toward the anode. Thereby, each diluting chamber 10 becomes depleted in its electrolyte content, while the alternating concentrating chambers 12 receive this electrolyte. Current is conducted to the battery of concentrating and diluting chambers 12 and 10 through the solutions in the electrode chambers 16 and the solutions in the washing chambers 14, with negligible contamination of the solutions being treated by products of electrolysis formed at the electrodes. The washing chambers 14 not only separate the terminal concentrating and diluting chambers 12 and 10 from the electrode chambers 16, but they also receive cations from the terminal diluting chamber 10 while supplying cations to the terminal concentrating chamber 12. It is for this reason desirable that the same solution as that being treated is circulated through the washing chambers 14.

In actual practice it is desirable to provide a large number of concentrating and diluting chambers between a single pair of electrodes, to minimize the fraction of electrical energy that is lost at the electrodes in the electrode processes. Cells containing between 20 and 600 pairs of chambers have proved entirely satisfactory. It is also preferred to maintain narrow spacing of the membranes, to provide cell chambers having a width of between about 0.5 and 5 millimeters, to minimize ohmic losses therein.

The membranes A and K should be electrically conductive, as well as selectively permeable to anions and cations respectively. Suitable membranes are described in our copending application referred to above.

A system of this invention particularly adapted for the removal of electrolyte impurities from solutions of non-electrolytes is shown in Fig. 2. It consists of four concentrating and diluting cells which in this case are also stages 1, 2, 3 and 4, each cell having a set of diluting chambers schematically represented as D (corresponding to chambers 10 shown in Fig. 1) and a set of concentrating chambers schematically represented as C (corresponding to chambers 12 shown in Fig. 1). The diluting chambers of the four stages are connected in series by conduits 44, 46 and 48, each connecting the combined effluent passage of one stage with the influent passage of the other stage. An influent connection to the first cell or stage 1, and an effluent connection from the last cell or stage 4 are provided by conduits 42 and 50 respectively. The concentrating chambers of each unit are supplied with an electrolytic solution by influent conduits 52, 54, 56 and 58 which is thereafter withdrawn through effluent conduits 53, 55, 57 and 59.

The transfer of electrolyte from one solution to another may be effected in the system described above by introducing the solution from which the electrolyte is to be removed into the diluting chambers of the several stages through conduit 42 and withdrawing it through conduit 50, while providing a concentrating solution for the concentrating chambers through conduits 52, 54, 56 and 58 which is withdrawn through conduits 53, 55, 57 and 59. The concentrating solution may be separate fractions of an electrolytic solution which are subsequently discarded as in cases where the electrolyte removed from the diluting solution is of little value, or the concentrating solution may be fed in series from stage to stage, preferably in the opposite order of flow, in order to enhance the concentration thereof and facilitate the recovery of valuable electrolytes therefrom. For series flow of the concentrating solution the effluent conduits 53, 55, and 57 from the concentrating chambers of each cell unit would be connected by appropriate conduit means to the influent conduits 54, 56, and 58 respectively of the adjacent stage, and the concentrating solution introduced through conduit 52 and withdrawn through conduit 59.

When the desired flow conditions have been established a direct electric current is passed through each cell and adjusted for efficient operation thereof, as by adjusting the voltage so that each cell operates at approximately the same demineralization ratio.

EXAMPLE I

The following example reports a typical operation of the system of this invention in the removal of sulfuric acid from an aqueous dextrose solution, .032 N in sulfuric acid and containing 20 per cent by weight of dextrose.

The dextrose solution was flowed at a rate of 200 gal./hr. in stage-to-stage series through the diluting chambers of four stage units and tap water (having an initial electrolyte concentration to render it conductive) was flowed at a rate of 20 gal./hr. in stage-to-stage series in the opposite order of flow through the concentrating chambers of the four stages. Each chamber of each cell had a volume of 135 cubic centimeters and an exposed membrane surface for each membrane of about one square foot. The number of diluting chambers in each stage is reported in Table I.

Table I

| Stage | No. of Diluting Chambers |
|---|---|
| 1 | 100 |
| 2 | 71 |
| 3 | 50 |
| 4 | 36 |

When flow conditions had been established, a potential of 80 volts D. C. was applied across each cell. The operating conditions are reported in Table II.

Table II

| Stage | Sulfuric Acid Content of Effluent Solutions, Normality | | Current, amperes |
|---|---|---|---|
| | Diluting Chambers | Concentrating Chambers | |
| 1 | 0.016 | .3 | 4.0 |
| 2 | 0.008 | .15 | 2.8 |
| 3 | 0.004 | .08 | 2.0 |
| 4 | 0.002 | .04 | 1.4 |

The power required was 4.08 kw. hr./100 gal.

In the above example, the demineralization ratio, D was 0.50, and each cell had $D^{0.5}$, or .71, times the number of diluting chambers of the preceding cell.

The foregoing detailed description of this invention is presented for purposes of illustration and modifications may be made therein without deviating from the scope of the invention. For instance, in operations where it is primarily necessary to concentrate a solution in electrolytes present in the diluting solution rather than to strip the diluting solution, the concentrating chambers of the several cells would be connected in stage-to-stage series while each set of diluting chambers could be fed with a separate fraction of diluting solution (rather than serially) to maintain the concentration of the diluting solution relatively high in each of the cells and thereby facilitate the transfer of electrolyte to the concentrating chambers.

The several concentrating and diluting cells may also be so arranged that a number of them (comprising the first stage) are fed with the diluting solution in parallel, and the effluent diluting solution is combined and flowed in parallel through a number of the other cells (comprising the second stage), combined again and flowed through one or more additional cells (comprising the third stage). Such an arrangement is suggested by Fig. 3 wherein the solution to be diluted is first flowed in parallel through three cells 100, 102 and 104, then combined and flowed through two units 106 and 108, then recombined and flowed through unit 110. All the solution thus flows in stage-to-stage series through one of the first stage of cells 100, 102 and 104, one of the second stage of cells 106 and 108, and through the ultimate stage or cell 110. Such an arrangement is particularly desirable where a rather concentrated solution is to be diluted, for in the initial stages of the series treatment high salt transfer capacity, provided by several cells in parallel, is required if the fractional reduction in concentration at each step of the series process is to be the same. The effect of paralleling several cells for the first stage is to provide additional membrane area for electrolyte transfer. The same effect may be achieved by constructing the cells with varying membrane areas either by varying the number of chamber pairs or the size of each chamber or both to provide progressively decreasing area from stage to stage.

The following three examples, wherein an aqueous solution 0.62 N in sodium chloride is reduced to a concentration of .0094 N, demonstrate the advantages that may be realized by progressively decreasing the membrane area from stage to stage to correspond roughly with the decreasing amount of salt removed by each successive stage. In each example the diluting stream was flowed in stage-to-stage series through the diluting chambers of each cell unit, and the concentrating stream consisted of a fraction of the final effluent diluting stream flowed in stage-to-stage series in the opposite order through the concentrating chambers of the last five stages and a stream of 0.62 N sodium chloride solution flowed through the concentrating chambers of the first stage. In each cell both streams were fed in parallel to their respective chambers in generally mutually countercurrent directions. Each membrane in each cell had an exposed area of 200 cm.², and each chamber had a volume of 20 cubic centimeters.

In each example the current to the several cell units was adjusted so that each cell removed approximately 50 per cent of the electrolyte from the influent diluting solution to it. The total flow rates and concentrations of the various streams entering and leaving each successive stage in Examples 2, 3, and 4 are given in Table III.

Table III

| Stage | 1 | 2 | 3 | 4 | 5 | 6 |
|---|---|---|---|---|---|---|
| Dilute Influent: | | | | | | |
| Flow rate, cc./sec | 7.6 | 7.1 | 6.9 | 6.8 | 6.7 | 6.7 |
| Concentration, N | 0.62 | 0.31 | 0.16 | 0.075 | 0.038 | 0.019 |
| Conc. Influent: | | | | | | |
| Flow rate, cc./sec | 3.5 | 1.9 | 1.8 | 1.7 | 1.7 | 1.7 |
| Concentration, N | 0.62 | 0.54 | 0.26 | 0.12 | 0.047 | 0.0094 |
| Dilute Effluent: | | | | | | |
| Flow rate, cc./sec | 7.1 | 6.9 | 6.8 | 6.7 | 6.7 | 6.7 |
| Concentration, N | 0.31 | 0.16 | 0.075 | 0.038 | 0.019 | 0.0094 |
| Conc. Effluent: | | | | | | |
| Flow rate, cc./sec | 4.0 | 2.1 | 1.9 | 1.8 | 1.7 | 1.7 |
| Concentration, N | 1.18 | 1.02 | 0.54 | 0.26 | 0.12 | 0.047 |

The operating data of Examples 2, 3 and 4 are reported in Table IV.

Table IV

| Stage | 1 | 2 | 3 | 4 | 5 | 6 | Overall |
|---|---|---|---|---|---|---|---|
| No. diluting chambers: | | | | | | | |
| Ex. 2 | 33 | 33 | 33 | 33 | 33 | 33 | 198 |
| Ex. 3 | 95 | 41 | 20 | 15 | 12 | 12 | 195 |
| Ex. 4 | 356 | 154 | 77 | 34 | 19 | 14 | 654 |
| Current, amperes: | | | | | | | |
| Ex. 2 | 12.8 | 5.3 | 2.4 | 0.98 | 0.43 | 0.21 | |
| Ex. 3 | 4.4 | 4.3 | 4.0 | 2.1 | 1.2 | 0.58 | |
| Ex. 4 | 1.18 | 1.13 | 1.04 | 0.95 | 0.74 | 0.50 | |
| Power, watts: | | | | | | | |
| Ex. 2 | 650 | 130 | 36 | 9.0 | 2.9 | 1.5 | 830 |
| Ex. 3 | 225 | 104 | 58 | 18 | 8.2 | 4.0 | 418 |
| Ex. 4 | 63 | 27.3 | 15.3 | 8.7 | 5.1 | 2.5 | 123 |
| Current efficiency, percent: | | | | | | | |
| Ex. 2 | 59 | 63 | 75 | 79 | 90 | 92 | |
| Ex. 3 | 54 | 63 | 74 | 82 | 88 | 92 | |
| Ex. 4 | 61 | 63 | 74 | 79 | 90 | 91 | |
| Unit power, kw. hr./1,000 gal.: | | | | | | | |
| Ex. 2 | | | | | | | 166 |
| Ex. 3 | | | | | | | 84 |
| Ex. 4 | | | | | | | 25 |

It will be seen from the foregoing examples that if the total membrane area is arranged in successive stages it is highly advantageous to provide the greatest membrane area in the initial stages and to decrease progressively the area per stage in each successive stage. The total membrane areas in Examples 2 and 3 are about the same, while the power requirements in Example 3, in which the number of diluting chambers progressively decreases in accordance with the progressively decreasing salt transfer per stage, is about half that of Example 2 in which the number of diluting chambers in each stage is the same. Example 4 shows that the power requirements are reduced by increasing the total membrane area. This, of course, increases the cost of the equipment, but may be more than balanced by the power savings realized, especially where power costs are high.

The foregoing examples approximate the application of this invention to the demineralization of sea water to reduce its salt content to a potable level.

Having thus disclosed our invention and described in detail a preferred embodiment thereof, we claim and desire to secure by Letters Patent:

1. Apparatus for transferring electrolyte from one solution to another comprising a plurality of juxtaposed interconnected stages, each stage having a plurality of concentrating chambers and a plurality of diluting chambers defined between alternate anion permselective and cation permselective membranes, means for passing a direct electric current in series through said membranes and chambers defined between them, first conduit means for passing a first solution through the concentrating chambers, second conduit means for passing a second solution through the diluting chambers, and means for combining the effluents from the diluting chambers of each stage; said stages being connected in hydraulic series with means for passing the combined effluents from the diluting chambers of each stage to the diluting chambers of the succeeding adjacent stage.

2. Apparatus for transferring electrolyte from one solution to another comprising a plurality of juxtaposed interconnected stages, each stage having a plurality of concentrating chambers and a plurality of diluting chambers defined between alternate anion permselective and cation permselective membranes, means for passing a direct electric current in series through said membranes and chambers defined between them, first conduit means for passing a first solution through the concentrating chambers, second conduit means for passing a second solution through the diluting chambers, and means for combining the effluents from the diluting chambers of each stage; said stages being connected in hydraulic series with means for passing the combined effluents from the diluting chambers of each stage to the diluting chambers of the succeeding adjacent stage, and means for passing the effluent from the concentrating chambers of each stage to the concentrating chambers of the adjacent stage.

3. Apparatus for transferring electrolyte from one solution to another comprising a plurality of juxtaposed interconnected stages, each stage having a plurality of concentrating chambers and a plurality of diluting chambers defined between alternate anion permeselective and cation permselective membrances, means for passing a direct electric current in series through said membranes and chambers defined between them, first conduit means for passing a first solution through the concentrating chambers, second conduit means for passing a second solution through the diluting chambers, and means for combining the effluents from the diluting chambers of each stage; said stages being connected in hydraulic series with means for passing the combined effluents from the diluting chambers of each stage to the diluting chambers of the succeeding adjacent stage, and means for passing the effluent from the concentrating chambers of each stage to the concentrating chambers of the preceding adjacent stage.

4. Apparatus for transferring electrolyte from one solution to another comprising a plurality of juxtaposed interconnected stages, each stage having a plurality of concentrating chambers and a plurality of diluting chambers defined between alternate anion permselective and cation permselective membranes, means for passing a direct electric current in series through said membranes and chambers defined between them, first conduit means for passing a first solution through the concentrating chambers and second conduit means for passing a second solution through the diluting chambers in the direction of flow substantially countercurrent to that provided by the first conduit means; and means for combining the effluents from the diluting chambers of each stage; said stages being connected in hydraulic series with means for passing the combined effluents from the diluting chambers of each stage to the diluting chambers of the succeeding adjacent stage.

5. Apparatus for transferring electrolyte from one solution to another comprising a plurality of juxtaposed interconnected stages, each stage having a plurality of concentrating chambers and a plurality of diluting chambers defined between alternate anion permselective and cation permselective membranes, means for passing a direct electric current in series through said membranes and chambers defined between them, first conduit means for passing a first solution through the concentrating chambers and second conduit means for passing a second solution through the diluting chambers in the direction of flow substantially countercurrent to that provided by the first conduit means; and means for combining the effluents from the diluting chambers of each stage; said stages connected in hydraulic series with means for passing the combined effluents from the diluting chambers of each stage to the diluting chambers of the succeeding adjacent stage, and means for passing the effluent from the concentrating chambers of each stage to the concentrating chambers of the adjacent stage.

6. Apparatus for transferring electrolyte from one solution to another comprising a plurality of juxtaposed interconnected stages, each stage having a plurality of concentrating chambers and a plurality of diluting chambers defined between alternate anion permselective and cation permeselective membranes, means for passing a direct electric current in series through said membranes and chambers defined between them, first conduit means for passing a first solution through the concentrating chambers and second conduit means for passing a second solution through the diluting chambers in the direction of flow substantially countercurrent to that provided by the first conduit means; and means for combining the effluents from the diluting chambers of each stage; said stages being connected in hydraulic series with means for passing the combined effluents from the diluting chambers of each stage to the diluting chambers of the succeeding adjacent stage, and means for passing the effluent from the concentrating chambers of each stage to the concentrating chambers of the preceding adjacent stage.

7. Apparatus for transferring electrolyte from one solution to another comprising a plurality of juxtaposed interconnected stages, each stage having a plurality of concentrating chambers and a plurality of diluting chambers defined between alternate anion permselective and cation permselective membranes, means for passing a direct electric current in series through said membranes and chambers defined between them, first conduit means for passing a first solution through the concentrating chambers, second conduit means for passing a second solution through the diluting chambers, and means for combining the effluents from the diluting chambers of each stage; said stages being connected in hydraulic series with means for passing the combined effluents from the diluting chambers of each stage to the diluting chambers of the succeeding adjacent stage, the total membrane area in each succeeding stage progressively decreasing in the direction of series flow in accordance with the progressively decreasing electrolyte transfer per stage.

8. Apparatus for transferring electrolyte from one solution to another comprising a plurality of juxtaposed interconnected stages, each stage having a plurality of concentrating chambers and a plurality of diluting chambers of approximately equal size defined between alternate anion permselective and cation permselective membranes, means for passing a direct electric current in series through said membranes and chambers defined between them, first conduit means for passing a first solution through the concentrating chambers, second conduit means for passing a second solution through the diluting chambers, and means for combining the effluents from the diluting chambers of each stage; said stages being connected in hydraulic series with means for passing the combined effluents from the diluting chambers of each stage to the diluting chambers of the succeeding adjacent stage, the number of chamber pairs in each stage progressively decreasing in each successive stage in accordance with the progressively decreasing electrolyte transfer per stage.

9. The method of treating solutions to transfer electrolyte from one solution to another solution comprising passing a first solution through the diluting chambers of each of a plurality of juxtaposed interconnected stages, each stage being composed of at least one cell having a plurality of concentrating and diluting chambers each having between them alternate selectively anion-permeable and selectively cation-permeable membranes, combining the effluents from the diluting chambers of each stage, the flow thereof from stage to stage being in series, passing a second solution through the concentrating chambers of each of the several stages, and passing a direct electric current in series through the alternating anion-permeable and cation-permeable membranes and the concentrating and diluting chambers defined therebetween.

10. The method of treating solutions to transfer electrolyte from one solution to another solution comprising passing a first solution through the diluting chambers of each of a plurality of juxtaposed interconnected stages, each stage being composed of at least one cell having a plurality of concentrating and diluting chambers each having between them alternate selectively anion-permeable and selectively cation-permeable membranes, combining the effluents from the diluting chambers of each stage, the flow thereof from stage to stage being in series, passing a second solution through the concentrating chambers of each of the stages and from stage to stage, and passing a direct electric current in series through the alternating anion-permeable and cation-permeable membranes and the concentrating and diluting chambers defined therebetween.

11. The method of treating solutions to transfer electrolyte from one solution to another solution comprising passing a first solution through the diluting chambers of each of a plurality of juxtaposed interconnected stages, each stage being composed of at least one cell having a plurality of concentrating and diluting chambers each having between them alternate selectively anion-permeable and selectively cation-permeable membranes, combining the effluents from the diluting chambers of each stage, the flow thereof from stage to stage being in series, passing a second solution through the concentrating chambers of each of the stages and from stage to stage in a direction opposite to the stage to stage flow of said first solution, and passing a direct electric current in series through the alternating anion-permeable and cation-permeable membranes and the concentrating and diluting chambers defined therebetween.

12. The method of treating solutions to transfer electrolyte from one solution to another solution comprising passing a first solution through the diluting chambers of each of a plurality of juxtaposed interconnected stages, each stage being composed of at least one cell having a plurality of concentrating and diluting chambers each having between them alternate selectively anion-permeable and selectively cation-permeable membranes, the total membrane area in each stage progressively decreasing in the direction of series flow in accordance with the progressively decreasing electrolyte transfer per stage, combining the effluents from the diluting chambers of each stage, the flow thereof from stage to stage being in series, passing a second solution through the concentrating chambers of each of the stages, and passing a direct electric current in series through the alternating anion-permeable and cation-permeable membranes and the concentrating and diluting chambers defined therebetween.

References Cited in the file of this patent

UNITED STATES PATENTS

| Number | Name | Date |
|---|---|---|
| 1,972,561 | Heubaum | Sept. 4, 1934 |
| 2,341,356 | Briggs | Feb. 8, 1944 |

FOREIGN PATENTS

| Number | Country | Date |
|---|---|---|
| 689,674 | France | June 2, 1930 |

OTHER REFERENCES

Meyer et al.: "Helvetica Chimica Acta," vol. 23 (1940), pp. 795–800.